United States Patent
Wang et al.

(10) Patent No.: US 6,373,152 B1
(45) Date of Patent: Apr. 16, 2002

(54) ELECTRICAL ENERGY STORAGE DEVICE

(75) Inventors: Pei-Jen Wang; Shun-Ming Huang; Wei-Chen Wu, all of Hsinchu (TW)

(73) Assignee: Synergy Scientech Corp. (TW)

(*) Notice: Subject to any disclaimer, the term of this patent is extended or adjusted under 35 U.S.C. 154(b) by 0 days.

(21) Appl. No.: 09/501,508

(22) Filed: Feb. 9, 2000

(51) Int. Cl.[7] ................................................. H02J 9/00
(52) U.S. Cl. ..................... 307/150; 320/167; 320/103; 307/109
(58) Field of Search ............................... 307/150, 125, 307/109; 320/103, 167, 112

(56) References Cited

U.S. PATENT DOCUMENTS 5,831,420 A * 11/1998 Myers ......................... 323/282
5,998,052 A * 12/1999 Yamin ............................ 429/9
6,016,049 A *  1/2000 Baughman et al. ......... 320/167

* cited by examiner

*Primary Examiner*—Josie Ballato
*Assistant Examiner*—Robert L DeBeradinis

(57) ABSTRACT

An electricity storage device and a portable electric-powered tool. The device comprises at least a battery; at least a super capacitor, which has lower internal impedance, when fully charged, than that of the battery and connects the battery in parallel; and an output end for supplying the electricity. The super capacitor is the major power supply for the pulse current output; the battery is used for generating electricity to the super capacitor and is the secondary power supply for the pulse current output. The connection of the battery and the super capacitor does not need any converters or current-limiting resistors.

8 Claims, 4 Drawing Sheets

ELECTRICAL ENERGY STORAGE DEVICE

BACKGROUND OF THE INVENTION

1. Field of the Invention

The present invention relates to an electricity storage device and a device using the same, and in particular, to a rechargeable electricity storage device which is preferably used in applications with pulsed load current and a portable electric-powered tool equipped with the same.

2. Description of the Prior Art

Portable and rechargeable electric-powered tools, such as cordless drills, electric saws or electric nail-puncher, need battery packs for supplying electricity. A battery pack forms an electricity storage device As shown in FIG. 1, a conventional battery pack, i.e. an electricity storage device 1, includes a plurality of batteries 2 connected in series and an electricity output end 3. A working voltage is achieved by cascading the plurality of batteries. Conventionally, a nickel-cadmium battery is used which can produce a large quantity of instantaneous current, that can be as high as twenty times its capacity, and is used for supplying pulse loading current. However, the energy density of the nickel-cadmium battery is not high enough, therefore it is heavy and has less available working time. A lithium battery such as a lithium ion or lithium polymer battery, though possessing advantages of light-weight and high energy density, is not suitable for large current discharging, and thus cannot be used in applications of pulsed load current. Therefore, conventional battery packs and portable electric-powered tools hold drawbacks of heavy weight and shortage in available working time.

Conventional battery packs and portable electric-powered tools are also strictly restricted by the characteristics of a secondary battery. Besides the disadvantages that the battery can not release electricity in high rates rand has limited power output, more problems arise especially in an application with pulsed load current. For examples, high electricity outputs will reduce the capacity and cycle life of the secondary battery, and usually the battery is recharged in an incomplete discharge state, which results in a severe memory effect and drastically reduces the battery capacity and life.

Connecting a capacitor to the battery is a solution to meet the requirement of a large and instantaneous current output. The battery may store a large quantity of electricity, but can not deliver the electricity very fast and is limited in output power. On the other hand, the capacitor can provide a large quantity of current, but can not last for a long time and its energy density is much lower than the battery. Among all types of capacitors, a super capacitor is suitable in an application of pulse loading current since it has a higher power, voltage and energy density than an ordinary capacitor. In a battery pack which includes a battery and a super capacitor, the battery mainly charges the super capacitor and the super capacitor mainly supplies a large current in an application of pulse loading current. Whereby, a wide variety of batteries can be used and the life and efficacy of the battery pack can be well ensured.

Conventional connections of batteries 2 and a super capacitor 4 are shown in FIG. 2 and FIG. 3. In these prior techniques, before connecting the battery 2 and the super capacitor 4, either a converter 5 as shown in FIG. 2, or an diode 6, current-limiting switch 7 and a current-limiting resistor 8 as shown in FIG. 3 are connected to avoid explosions of the super-capacitor. The conventional connections hold the disadvantages of high cost, complex and difficult in assembly.

The present invention aims to overcome problems of the prior art and discloses an electricity storage device and a portable electric-powered tool which perform efficiently, have an extended life and are not restricted by the battery types.

SUMMARY OF THE INVENTION

It is an object of the present invention to provide an electricity storage device which can meet the requirement of instantaneous high power output and extend available working time. The battery capacity can be fully utilized and the battery life can be extended. In addition, the cost can be reduced and the assembly is simple.

It is a still object of the present invention to increase varieties of batteries in an application of high power output. Not only the nickel-cadmium battery, but also high energy density batteries such as nickel-metal hydride batteries, lithium-ion batteries and lithium polymer batteries can be used without any modifications. Even for an ordinary battery, it does not need to sacrifice its energy density in meeting any requirements of increasing power density.

It is a further object of the present invention to provide a more convenient and lighter battery pack which has higher capacity and can be used for more times and avoids memory effect.

It is a further object of the present invention to provide a portable electric-powered tool which utilizes the above electricity storage device and has advantages thereof To achieve the above objects and avoid the disadvantages of the prior art, the present invention discloses an electricity storage device which comprises at least one battery; at least a super capacitor which has a less internal impedance when fully charged than that of the battery and connects the battery in parallel; and an output end for supplying the electricity; whereby, the super capacitor is the major electric power supplier of pulse current output and the battery is used for providing electricity to the super capacitor and is the minor electric power supplier of pulse current output. The connection of the battery and the super capacitor does not need any convectors or current-limiting resistors.

In embodiments, the battery types include lithium battery, nickel-cadmium battery, nickel-zinc battery and nickel-metal hydride battery. The lithium battery is preferable since it is light, has a high capacity, can be repeatedly used for an extended period of time and does not have memory effect. In an application where a plurality of batteries are required, the batteries are connected to each other in series.

In another embodiments, the electricity storage device of the present invention further comprises a battery protection and control device, and a bi-directional switch which connects the battery in series. The battery protection and control device is used for controlling the switch of the bi-directional switch. Whereby the battery is protected from being overcharged, being over discharged and being operated in the condition of large discharging current.

The electricity storage device may further comprise a zener diode which connects the super capacitor in series. Therefore, the super capacitor is prevented from being operated at over voltage and the energy storage device is prevented from being operated at over current.

The present invention also discloses a portable electric-powered tool, which cannot be separated from the electricity storage device in practical applications of pulse loading current output, comprising a tool body and a battery pack for supplying electricity to the tool body; the battery pack comprises at least one battery and at least a super capacitor which connects the battery in parallel; wherein the super capacitor has lower internal impedance when fully charged than that of the battery; whereby, the super capacitor is the major electric power supply for pulse current output and the battery is used for providing electricity to the super capacitor and is the secondary power supply for pulse current output. The connection of the battery and the super capacitor does not need any converters or current-limiting resistors.

DESCRIPTION OF THE DRAWINGS

FIG. 9 depicts the battery pack voltage and output current of the entire battery pack when the electric-powered tool according to the invention is screwing a screw in; and FIG. 10 depicts the battery pack voltage and output current of the battery when the electric-powered tool according to the invention is screwing a screw in;

DETAILED DESCRIPTION OF THE INVENTION

The super capacitor herein refers to a capacitor which uses a double layer structure and whose electrodes are made by a special process to form a porous structure for increasing the surface area per unit weight. The capacitance usually reaches one or several farads, far higher than the capacitance of common capacitors which adopt electrophoresis. The energy of a super capacitor can be delivered in a very short time. Conventionally, it is believed that the super capacitor has very low internal impedance and a direct connection will result in extremely high charging current and that the super capacitor and batteries may be damaged or even explode.

The common capacitor, for example, an electrolytic capacitor, can be regarded as an ideal capacitor which connects a series resistor and parallel resistors (Equivalent Series Resistance and Equivalent-Parallel Resistance, ESR and EPR). If the instantaneous current flowing through the capacitor is extremely high, the electrolytes in the capacitor will be heated by Joule effects and the parallel resistance will decrease. The electrodes will become thermally unstable and eventually explode.

Figure 1:
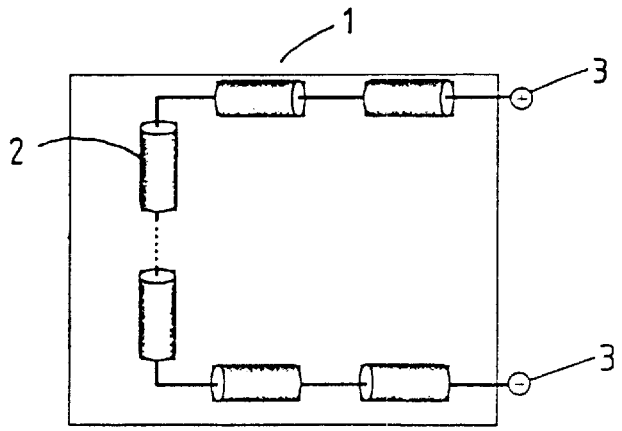
FIG. 1 depicts a conventional nickel-cadmium battery pack.
Figure 2:
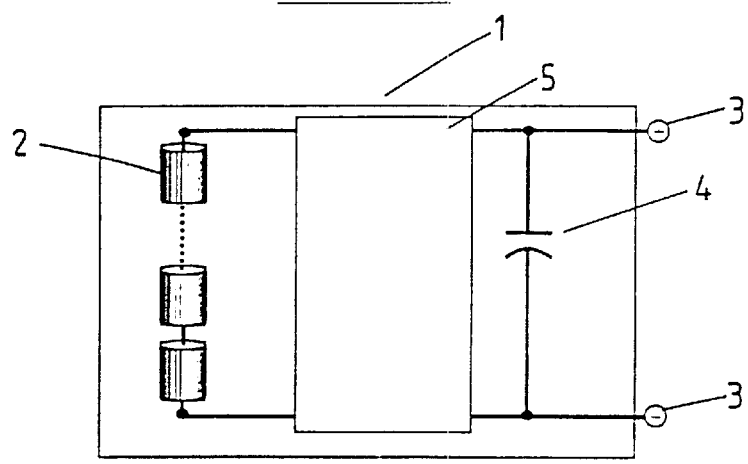
FIG. 2 depicts a conventional connection of batteries and a super capacitor.
Figure 3:
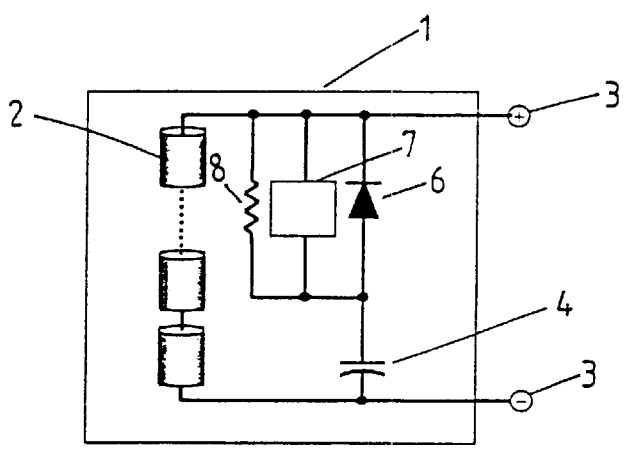
FIG. 3 depicts a conventional connection of batteries and a super capacitor.
Figure 4:
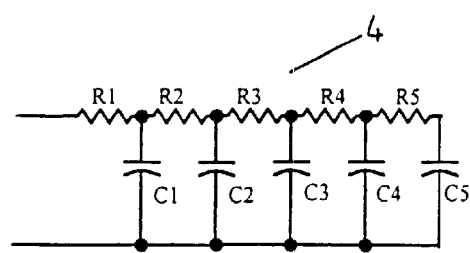
FIG. 4 depicts a model of a super capacitor.

In fact, it is clear that, according to embodiments of the invention, since the super capacitor has a different structure with that of a common capacitor and is similar to a lithium battery, its internal impedance will vary according to discharge conditions and it will not explode as conventionally expected as long as it is in a suitably designed battery system. Under a design rule, the super capacitor and the batteries can be directly connected and that no more converters nor current-limiting devices are required. The internal impedance of the super capacitor is variable according to the discharge state. The super capacitor can be simulated in circuitry by a model as shown in FIG. 4. When the super capacitor is fully charged, its internal impedance is almost equal to R1. When the super capacitor starts to discharge, the internal impedance of the super capacitor rises and the effects of impedance R2 to R5 appear.

Figure 5:
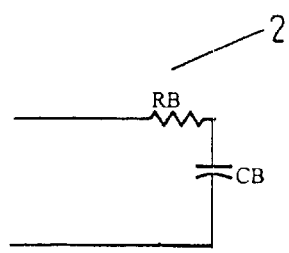
FIG. 5 depicts a model of a battery.

Compared to the super capacitor, the battery has a fixed internal impedance RB during discharge and can be simulated in circuitry by a model as shown in FIG. 5.

The design rule shows that as long as R1 (as shown in FIG. 4), which stands for the internal impedance of the super capacitor 4 when fully charged, is less than the internal impedance RB of the battery 2 (as shown in FIG. 5). The super capacitor 4 and the battery 2 can be directly connected without converters nor current-limiting devices. At the beginning of discharge, most discharge current is supplied by the super capacitor. However, after a period of time, the apparent internal impedance of the super capacitor will increase and the discharge current will decrease. When the apparent impedance of the super capacitor exceeds the internal impedance RB of the battery, the battery will automatically recharge the super capacitor.

For the parallel connection of the super capacitor and the battery, the present invention provides the following originality. Before the super capacitor connects the battery, the super capacitor is charged to a voltage near the battery voltage. Then the super capacitor is connected to the battery. There could be one battery or more than one battery, depending on the requirements of the working voltages. Since the super capacitor has a voltage near the battery voltage, the charge current from the battery to the super capacitor is limited and thus neither converters nor current-limiting devices are necessary. That is, as long as the super capacitor is charged first to an extent that high current will not appear at the instantaneous when the super capacitor connects the battery, the current between the super capacitor and the battery will reach an equilibrium state and thus no convectors or current-limiting devices are required.

If the internal impedance of the super capacitor and the battery is optimally matched, i.e. R1 is less than RB, instantaneous large current will be supplied by the super capacitor. When the electricity in the super capacitor nears depletion, the battery will charge the super capacitor. Therefore, the whole system can produce instantaneous large current, and the battery can release electricity completely.

Figure 6:
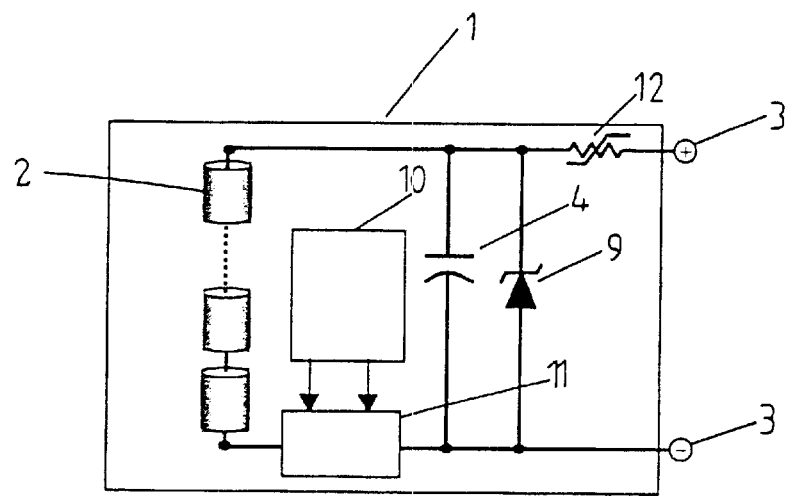
FIG. 6 depicts a preferred embodiment of the electricity storage device according to the present invention.

A preferred embodiment of the electricity storage device 1 according to the present invention is depicted in FIG. 6. In an application of a rechargeable electric-powered tool such as a cordless drill, which has a loading of large pulse current, the large loading current is supplied by the super capacitor 4 of the electricity storage device 1, or said battery pack. The secondary lithium battery 2 stores electricity and charges the super capacitor 4 when the super capacitor 4 releases most of its electricity. The charged super capacitor 4 is then ready for next pulse current. This way, the lithium battery 2 does not have to release its electricity in a large quantity instantaneously and its life can be extended.

Since the lithium battery has a higher energy density and is lighter in weight than the conventional nickel-cadmium battery, the battery pack becomes lighter. The total power density, i.e. the output power per unit weight of the battery pack according to the present invention is greatly enhanced.

As persons skilled in the art can understand, the battery of the electricity storage device according to the present invention includes any types of secondary batteries and primary batteries.

Protections of the battery 2 in a preferred embodiment of the present invention further include a battery protection and control device 10, and a bi-directional switch 11 which connects the battery 2 in series. The battery protection and control device 10 is used for controlling the switch of the bi-directional switch 11. The battery 2 will be protected from being overcharged. When the battery pack is being charged and the battery voltage exceeds a rated voltage, the control device 10 will send a signal to the bi-directional switch 11, cut off the discharging circuit and the battery is no more charged. Furthermore, the battery 2 will be protected from being over discharged. When the battery pack is being discharged and the battery voltage is lower than a rated voltage, the control device 10 will send a signal to the bi-directional switch 11, cut off the charging circuit and the battery will no longer discharge. As well, the battery 2 will be protected from being operated with a large discharge current. When the battery pack is being discharged and the battery current exceeds a rated current, the control device 10 will send a signal to the bi-directional switch 11, cut off the discharging circuit, and the battery will no longer discharge.

Protections of the super capacitor 4, in a preferred embodiment of the present invention, further includes a zener diode 9 and a polyswitch 12 which protect the super capacitor 4 from being operated at over voltage. When the voltage of the super capacitor 4 exceeds the rated voltage of the zener diode 9, the conduction of the zener diode 9 will commence and current will flow through the same and the super capacitor 4 is ensured not to operate at over voltage. And, the battery pack will be protected from being operated at over current. The polyswitch 12 is a resistor having a positive temperature coefficient. When the battery pack current is too high, the polyswitch 12 temperature will increase and so will the resistance which then will result in an open circuit and the battery pack is ensured not to operate at over current and high temperature.

EXAMPLE

Figure 7:
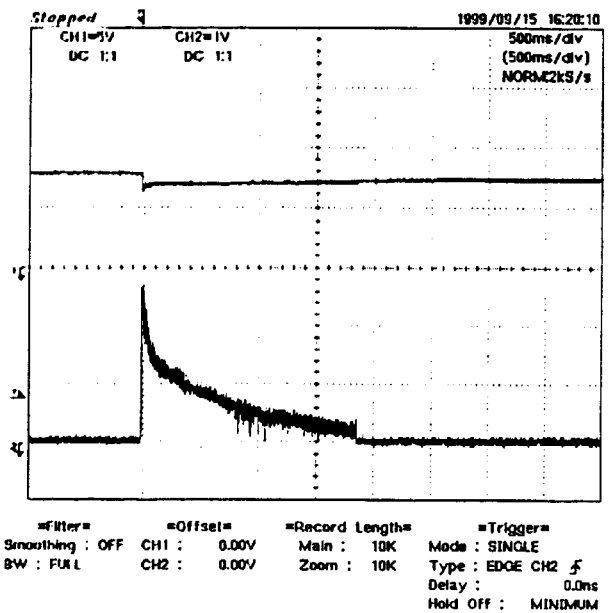
FIG. 7 depicts the battery pack voltage and output current of the entire battery pack when the electric-powered tool according to the invention is unscrewing a screw.
Figure 8:
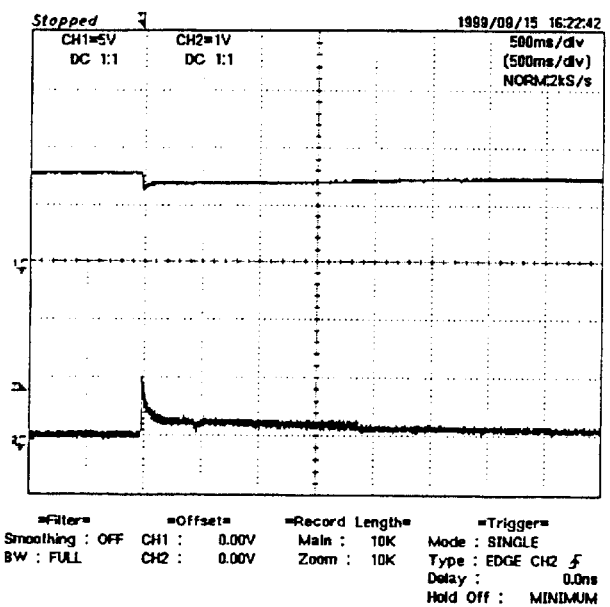
FIG. 8 depicts the battery pack voltage and output current of the battery when the electric-powered tool according to the invention is unscrewing a screw.
Figure 9:
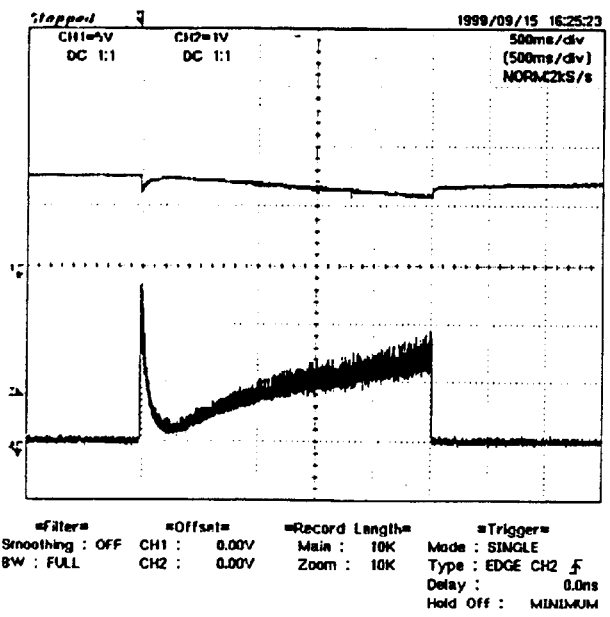
Figure 10:
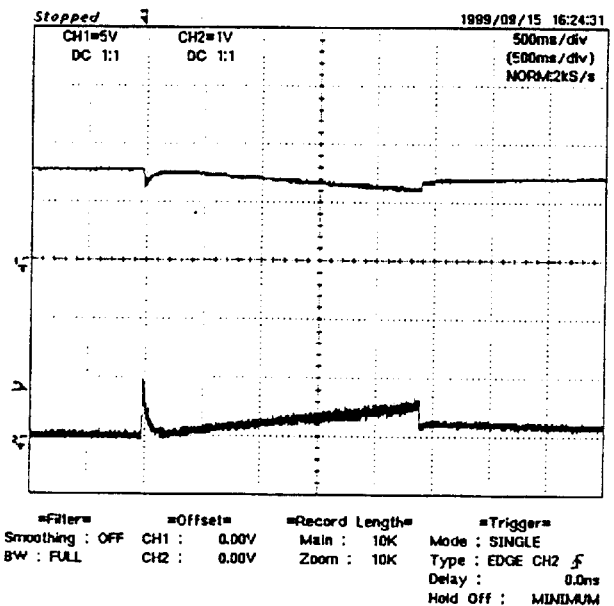

1. Experiment Method
   screwing a screw into and out of a wood plate by a cordless drill and measuring voltage and current.
2. Experiment Instruments and Tools:
   Kumas KD3643A DC7.2V cordless drill
   Battery cell 18650
   ELna 2.5V 50F super capacitor
   Tektronix current probe
   Yogogawa oscillator scope
   Connection: the connection is as shown in FIG. 6. The batteries include two 18650 batteries in series and the capacitors which include three 2.5V and 50 F super capacitors, and protection devices are incorporated.
3. Results
   a. Unscrewing a Screw
   The consumption wave diagram in unscrewing a screw is shown in FIG. 7. In which the time scale is by 0.5 second per division, the upper half shows the battery pack voltage (5 volts per division) and the lower half shows output current of the entire battery pack (10 amperes per division). The current of the battery pack is highest at the beginning and gradually slows down as the screw- is screwed out, at the time the required torque is decreasing.
   The output current of the lithium battery is shown in FIG. 8. At which the time scale is 0.5 second per division, the upper half shows the battery pack voltage (5 volts per division) and the lower half shows the output current of the lithium battery (10 amperes per division). FIG. 8 shows that the average output current of the lithium battery is less then 2 amperes and which indicates that the super capacitor supplies most of the output current of the entire battery pack.
   b. Screwing the Screw In
   The current consumption waveform diagram in screwing the screw in is shown in FIG. 9. At which the time scale is by 0.5 second per division, the upper half shows the battery pack voltage (5 volts per division) and the lower half shows output current of the entire battery pack (10 amperes per division). When the electric drill's motor is started, there is a large quantity of instantaneous current at the beginning. As the screw is screwed in, the required torque increases and the current consumption becomes larger.
   The output current of the lithium battery is shown in FIG. 10. At which the time scale is by 0.5 second per division, the upper half shows the battery pack voltage (5 volts per division) and the lower half shows the output current of the lithium battery (10 amperes per division). FIG. 10 shows that the average output current of the lithium battery is less then 2 amperes and which indicates that the super capacitor supplies most of the output current of the entire battery pack.

By the disclosure of the present invention, an electricity storage device and a portable electric-powered tool which are highly efficient, have a long life, not restricted by battery types and are convenient, can be obtained. Energy utilization becomes more efficient, and the battery pack and applications thereof are more effective and efficient.

The above detailed descriptions are only preferred modes and are not intended to limit the protection scope of the present invention. Numerous modifications and variations can be made without departing from the scope and spirit of the present invention and are intended to be included in the scope of the present invention.

What is claimed is:
1. An electricity storage device, comprising:
   at least one battery;
   at least a super capacitor, which has lower internal impedance when fully charged than that of the battery and connects the battery in parallel; and
   an output end for supplying the electricity;
   whereby, the super capacitor is the major power supply for pulse current output, and the battery is used for providing electricity to the super capacitor and is the secondary power supply for pulse current output.
2. The electricity storage device of claim 1, further comprising a battery protection and control device and a bi-directional switch which is connected in series with the battery; wherein the battery protection and control device is used for controlling the bi-directional switch.
3. The electricity storage device of claim 1, wherein the battery is a secondary battery.
4. The electricity storage device of claim 1, wherein the battery is a lithium secondary battery.
5. A portable electric-powered tool, comprising:
   a tool body; and
   a battery pack for supplying electricity to the tool body; the battery pack comprises at least a battery and at least a super capacitor which connects the battery in parallel; wherein the super capacitor has less internal impedance when fully charged than that of the battery;
   whereby, the super capacitor is the major power supply for pulse current output, and the battery is used for providing electricity to the super capacitor and is the secondary power supply for pulse current output.

6. The portable electric-powered tool of claim 5, wherein the battery pack further comprises a battery protection and control device and a bi-directional switch which is connected in series with the battery; the battery protection and control device is used for controlling the bi-directional switch.

7. The portable electric-powered tool of claim 5, wherein the battery is a secondary battery.

8. The portable electric-powered tool of claim 5, wherein the battery is a lithium secondary battery.

* * * * *